July 9, 1968
J. R. CROSS
3,391,659
CONTROL DESK FOR EMERGENCY VEHICLE
Filed Sept. 23, 1966
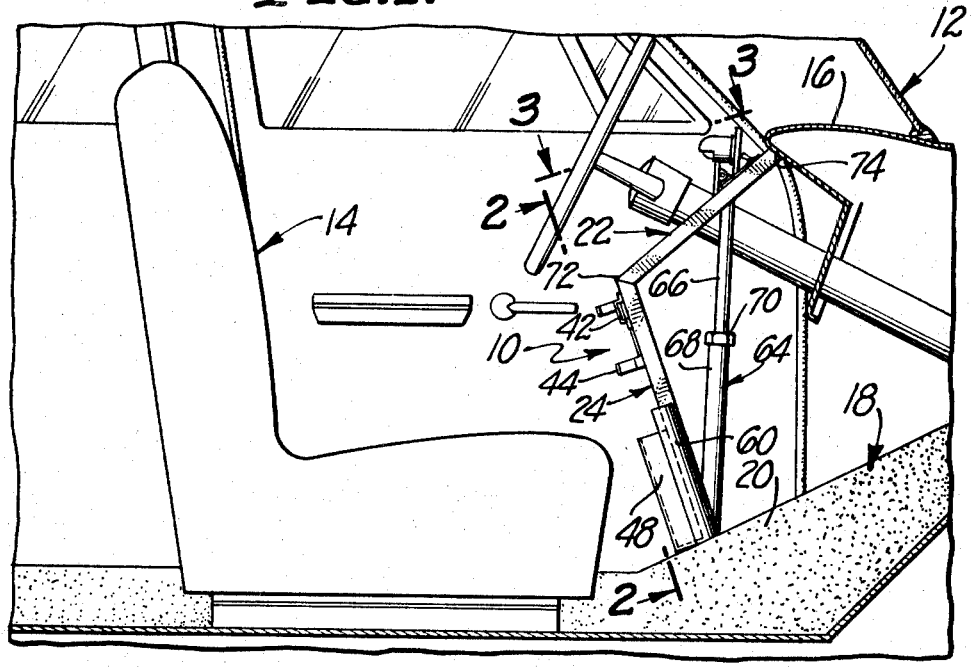
INVENTOR
JAMES R. CROSS
BY
EDWARD D. O'BRIAN
ATTORNEY

United States Patent Office 3,391,659
Patented July 9, 1968

3,391,659
CONTROL DESK FOR EMERGENCY VEHICLE
James R. Cross, 504 Winston Ave.,
Bradbury, Calif. 91010
Filed Sept. 23, 1966, Ser. No. 581,501
9 Claims. (Cl. 108—45)

ABSTRACT OF THE DISCLOSURE

This invention is directed to a control desk for an emergency vehicle. The control desk comprises a first panel adapted for writing and the placement of control equipment, and a second panel adapted for the retention of equipment. The first panel is adapted to be disposed in a vehicle at an appropriate writing height and angle while the second panel depending downwardly from the first panel to support the first panel. The second panel is adapted for floor engagement in the vehicle. Furthermore, at least one leg is secured to both the first and second panels so as to firmly retain them in proper orientation. The first area includes an illumination light, for writing, together with its control switch. It also carries other switches for control of emergency vehicle equipment, such as flashing lights and sirens. The second area includes structure for supporting equipment, such as radio, microphones, flash light, flares, night stick and/or other equipment or weapons. Preferably, the bottom of the second panel includes pockets into which loose articles such as flares or summons books may be secured.

Background

Emergency vehicles have the requirement that additional equipment be conveniently accessible to the operator of the vehicle. This additional equipment includes emergency equipment, defense equipment, signal equipment and a place for storage and handling of papers. Suitable control desks for such emergency vehicles have not previously been available to satisfy this need. Furthermore, the requirement for providing a desk having suitable features and having proper shape and structure for meeting these needs has not been satisfied.

Description

Accordingly, it is an object of this invention to provide a control desk for emergency vehicles, which control desk is of proper size, shape and positioning so as to satisfy the requirements of this service. It is another object of this invention to provide a control desk which has a first panel which is arranged and positioned for writing, and a second panel which is particularly arranged to support equipment, these two panels being firmly associated with each other and adapted to be rigidly mounted within an emergency vehicle. It is a further object of this invention to provide a control desk for emergency vehicles, which desk is versatile so that its basic structure may be used in different manners to mount control switches, lights, emergency and defense equipment. It is still another object of this invention to provide a control desk which is economic and trouble free so that it has a long trouble free life. Other objects and advantages of this invention will become apparent from a study of the following portion of this specification, the claims and the attached drawing.

FIG. 1 is a partial longitudinal sectional view taken through an automotive emergency vehicle having mounted therein the control desk of this invention.

FIG. 2 is an enlarged view of the control desk taken generally along the line 2—2 of FIG. 1.

FIG. 3 is an enlarged view of the control desk taken generally along the line 3—3 of FIG. 1.

Referring now to the drawing, the control desk for use in emergency vehicles is generally indicated at 10. The positioning and support of the control desk 10 within an emergency vehicle is illustrated in FIG. 1. The emergency vehicle is generally indicated at 12 and includes a driver's seat 14 equipped with the usual devices for controlling the speed and direction of the vehicle. The vehicle 12 has a conventional dashboard 16 and floor 18. In the embodiment illustrated, the floor has a hump 20 to accommodate the transmission of the vehicle.

Control desk 10 has a first panel 22 and a second panel 24. First panel 22 has a relatively flat top 26 which is adapted to be arranged with in the vehicle 12 at a suitable height, angle and position with respect to a driver occupying driver's seat 14, so as to enable him to write on paper secured thereto and to conveniently read from papers secured thereto. To aid in the securement of papers, spring clip 28 is pivotally mounted with respect to top 26, at the top of the writing area thereof. Thus, paper, such as papers 30, can be removably secured to top 26 for reading or writing upon. To further aid the reading and/or writing function, light 32 is secured to the panel 22 and is suitably hooded, so that light can be directed on to the writing area of top 26. Light 32 can be controlled by one of the switches 34 on the control desk. The other can control, if desired, the loud speaker on the inter-communication radio. Furthermore, further switches 36 can be installed upon panel 22 for the control of the lighting equipment of the emergency vehicle 12. For example, switches 36 can control red or yellow flashers, sirens and/or other signalling equipment.

Second panel 24 has a front 38 which is directed toward the driver's seat 14. Front 38 can conveniently support brackets 40 and 42 which are arranged to support microphones or the like. Similarly, flash light holder 44 can be secured to front 38. It should be noted that both the brackets 40 and 42 as well as the flash light holder 44 are positioned on the upper portion of front 38 so that the items held will be conveniently positioned with respect to the driver sitting in seat 14. The lower portion of front 38 carries receptacles 46 and 48. These receptacles are formed by front wall 50, spaced from front 38, end walls 52 and 54, dividing wall 56 and bottom 58. Front wall 50 extends high enough so that it is approximately level with the seat portion of driver's seat 14. Thus, items within receptacles 46 and 48 are accessible to the driver. These items may be flares, summons books, papers or the like. Receptacle 60 is tubular in form and is secured to the right side of front 38 adjacent end wall 54. Receptable 60 is of such dimension as to accept a night stick. Thus, it is also conveniently available to the driver.

In order to provide a maximum rigidity to the panels of the control desk, and particularly to the top 26, legs 62 and 64 are secured between panels 22 and 24. The bottom ends of these legs are flexibly secured to a flange at the bottom of panel 24. Legs 62 and 64 are each formed of first and second telescoping portions 66 and 68. As is shown portion 66 slides within the tubular portion 68, and locknut 70 is arranged to secure them together. The top end of telescoping portion 66 is flexibly secured to the bottom of panel 22, between the joint 72 and its rear edge, while the bottom end of the portion 68 is flexibly secured to the bottom of panel 24. Joint 72 joins the front of panel 22 with the top of panel 24 and is resilient. Thus, a certain amount of adjustability is provided on the angle between the two panels. This permits adjustment so that the rear edge 74 of panel 22 can be secured to the dashboard 16 while the bottom of panel 24 can be secured to the top of hump 20. When secured, locknuts 70 are locked so as to provide a rigid structure.

In use, the control desk 10 is installed in an emergency vehicle 12, in the manner shown. It is electrically connected and provided with the necessary facilities. Thus, all necessary materials and equipment are immediately available adjacent the driver of the emergency vehicle. Thus, notes can be made, lists retained and read and emergency equipment made available for ready use.

This invention having been described in its preferred embodiment, it is clear that it is susceptible to numerous modifications and embodiments within the routine ability of those skilled in the art and without the exercise of the inventive faculty. Accordingly, the scope of this invention is defined by the scope of the following claims.

I claim:

1. A control desk adapted for installation in an emergency vehicle, said control desk comprising first and second panels, said first panel having a substantially flat top and adapted to be positioned at a writing angle within the emergency vehicle, said second panel having a front and being adapted to be positioned substantially upright within the emergency vehicle, said first and second panels being joined together, said first panel being adapted to be secured to the dashboard of the emergency vehicle and said second panel being adapted to be secured to the floor of the emergency vehicle, at least one leg secured between said first panel and said second panel so as to secure said first panel and said second panel with respect to one another, a spring clip located on the top surface of said first panel, said spring clip being adapted to retain papers on said top of said first panel, a light located on said first panel, said light being positioned so as to be adapted to illuminate papers held by said spring clip, brackets located on said front of said second panel, said brackets being adapted to detachably retain emergency equipment.

2. The control desk of claim 1 wherein said front of said second panel has brackets thereon, said brackets being adapted to detachably retain emergency equipment.

3. The control desk of claim 1 wherein at least one receptacle is provided on the front of said second panel, said receptacle being adapted to retain emergency equipment.

4. The control desk of claim 1 wherein the front of said first panel and the top of said second panel are adjustably joined and said leg is adjustable in length, said leg being lockable so as to lock said first panel at a particular angular relationship with respect to said second panel.

5. A control desk adapted to be installed in an emergency vehicle, said desk comprising:

a first and a second panel, said panels having adjacent edges which are joined together at an angle to one another, said first panel having a substantially flat top and being adapted to be positioned at a writing angle within said vehicle, said second panel having a front and being adapted to be positioned substantially upright within said emergency vehicle, said first panel being adapted to be secured to the dashboard of said emergency vehicle and said second panel being adapted to be secured to the floor of said emergency vehicle, leg means secured to and extending between said first and said second panels so as to secure said panels with respect to one another, means for retaining emergency equipment located on said second panel.

6. A control desk as claimed in claim 5 wherein said leg means are adjustable in length and are capable of being locked so as to hold said panels in a particular angular relationship.

7. A control desk as claimed in claim 5 including clip means on said first panel for retaining papers on said first panel.

8. A control desk as claimed in claim 5 wherein said means for retaining comprises brackets, said brackets being adapted to detachably retain emergency equipment.

9. A control desk as claimed in claim 5 wherein said means for retaining comprises at least one receptacle adapted to retain emergency equipment located on the front of said panel.

References Cited

UNITED STATES PATENTS

| 2,328,471 | 8/1943 | Leffel | 108—23 X |
|---|---|---|---|
| 2,522,602 | 9/1950 | Burns | 108—45 X |
| 2,741,521 | 4/1956 | Bell et al. | 108—44 |
| 2,771,331 | 11/1956 | Messman | 108—45 |
| 2,792,267 | 5/1957 | Hubbard | 108—45 |
| 2,898,170 | 8/1959 | Antonius | 108—45 |
| 3,104,895 | 9/1963 | Feuerbach et al. | 108—45 |

BOBBY R. GAY, *Primary Examiner.*

G. O. FINCH, *Assistant Examiner.*